United States Patent
Ferruti et al.

(10) Patent No.: US 6,660,810 B1
(45) Date of Patent: Dec. 9, 2003

(54) NON CROSS-LINKED BLOCK POLYETHERESTER, PREPARATION AND USES

(75) Inventors: Paolo Ferruti, Milan (IT); Piero Orsolini, Martigny (CH)

(73) Assignee: Debio Recherche Pharmaceutique SA (FR)

(*) Notice: Subject to any disclaimer, the term of this patent is extended or adjusted under 35 U.S.C. 154(b) by 0 days.

(21) Appl. No.: 09/674,375

(22) PCT Filed: Apr. 28, 1999

(86) PCT No.: PCT/EP99/02891

§ 371 (c)(1),
(2), (4) Date: Dec. 20, 2000

(87) PCT Pub. No.: WO99/55760

PCT Pub. Date: Nov. 4, 1999

(30) Foreign Application Priority Data

Apr. 28, 1998 (FR) .............................. 98 05306

(51) Int. Cl.[7] .................. C08G 63/64; C08G 81/00
(52) U.S. Cl. ................. 525/439; 528/301; 528/302; 528/303; 528/306; 525/447
(58) Field of Search ................ 525/439, 447; 528/301, 302, 303, 306

(56) References Cited

U.S. PATENT DOCUMENTS 4,440,892 A   4/1984   Wolf et al.
5,674,468 A * 10/1997  Klaveness .................. 424/9.3

FOREIGN PATENT DOCUMENTS

EP    0 812 868      12/1997
GB    2 211 091       6/1989
WO    WO 92/22600    12/1992
WO    WO 98/06439     2/1998

OTHER PUBLICATIONS

Nagata et al., "Polymer International", vol. 42, 1997, pp. 33–34, Table 3, XP 00209307.
R. Duncan, "Anti–cancer drugs", vol. 3, 1992, pp. 175–210, XP000430668.
Neuse, E. W. et al., "carrier polymers for cisplatin–type anticancer drug models" vol. 7, n° 12, 1996, pp. 867–872, XP000635896.
A.–C. Albertsson et al., "J. Macromol. Sci.–Chem", vol. A23, n°3, 1986, pp. 411–422, XP002090308.
Suggs, L. J. et al. "Synthesis and characterization of a block copolymer consisting of poly (propylene fumarate) and poly (ethylene glycol)", vol. 30, n°15, 1997, pp. 4318–4323, XP00065771.
Chemical abstracts, vol. 125, n° 2, 1996, XP002090309.

* cited by examiner

Primary Examiner—Patricia A. Short
(74) Attorney, Agent, or Firm—Piper Rudnick LLP

(57) ABSTRACT

The present invention relates to a non crosslinked block polymer. It also relates to a process for the preparation thereof and to the use thereof particularly in pharmaceutical compositions. The block polymer according to the invention contains sequences of polyethylene glycol linked to sequences of polyester and/or polycarbonate. The polyester sequences are selected in particular from polyfumarate, polymaleate and polysuccinate sequences.

3 Claims, No Drawings

NON CROSS-LINKED BLOCK POLYETHERESTER, PREPARATION AND USES

TECHNICAL FIELD

The present invention relates to a non crosslinked block polymer.

It also relates to a process for the preparation thereof and to the use thereof particularly in pharmaceutical compositions.

BACKGROUND

The block polymer according to the invention contains sequences of polyethylene glycol linked to sequences of polyester and/or polycarbonate. The polyester sequences are selected in particular from polyfumarate, polymaleate and polysuccinate sequences.

The most advantageous polyester sequences according to the present invention are polyfumarates and polysuccinates.

Polysuccinates and polyfumarates have been described in patent application EP0043976 and have already been tested for their use in pharmaceutical compositions but were ruled out because of their highly hydrophobic nature and their poor biodegradability.

OBJECTS OF THE INVENTION

Nevertheless, the Applicant company has succeeded in developing polymers containing said polyesters which are particularly suitable for use in pharmaceutical compositions.

The Applicant company has, in fact, discovered that the insertion of hydrophilic sequences of polyethylene glycol polymers into chains of polyfumarate, polysuccinate and polymaleate improves the biocompatibility of said polymers whilst reducing the toxicity thereof.

DETAILED DESCRIPTION

The block polymer according to the present invention has the following general formula (I):

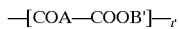

wherein:

z=1 to 20, s=0 to 25,

Pa represents:

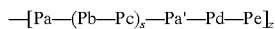

where:

t=1 to 150, and

A represents CH=CH or $CH_2$—$CH_2$

B represents $(CH_2)_n$—O— where n=1 to 8,

Pb and Pd, each independently, represent:

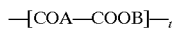

where x=0 or 1;

Pc and Pe, each independently of one another, represent:

where:

u=0, to 150, and

R represents an alkyl, cycloalkyl, alkenyl, alkynyl or aryl group, optionally substituted, Pa' represents

where A has the same meaning as above

B represents $(CH_2)_n O$, where n =0 to 8 or $[RO]_u$, R and u being defined as above, and t'=0 to 150;

provided that if s=0, t'=0, x=0 and u=0 then B does not represent $(CH_2)_4O$ if A is $CH_2CH_2$.

The weight-average molecular mass of the polymer is in the range 2,000 daltons to 300,000 daltons.

The polyethylene glycol (PEG) sequences introduced into the polymers according to the present invention may be linked either directly to the polyesters or by way of polycarbonate linkages.

The advantage of introducing PEG by way of polycarbonate linkages lies in the fact that the degradation of the polymers may be modified depending on the number and length of the polycarbonate sequences introduced into the polymer.

The presence of polycarbonate sequences has the effect of retarding the rate of degradation.

Thus, the polymers according to the invention allow great flexibility in terms of the choice of their biodegradability and hydrophilic properties. In fact, it is possible to modify the biodegradability and hydrophilic properties of the polymer by altering:

the number of polycarbonate sequences and the number of PEG sequences in each unit of the polymer, the length of the hydrophobic and hydrophilic sequences in each unit of the polymer, the length of the polymer.

The presence of hydrophilic PEG increases the water solubility of the polymer whilst reducing its immunogenicity. Moreover, the introduction of PEG sequences as described by M. NAGATA et al. in Polymer International, Vol. 42, permits better biodegradability of the polyfumarates and polysuccinates. In fact, for the same weight of polymer, the biodegradability is greater in the presence of PEG.

The polymers according to the present invention may have a very high molecular weight, from 20,000 daltons upwards, whilst remaining soluble and biodegradable. Said high molecular weight polymers may be concentrated on tumours by targeting the tumour cells by an effect known as "Enhanced Permeability Retention Effect" (EPR). In fact, the vascular walls of tumour cells are more permeable to macromolecules than the vascular walls of healthy cells.

The proportion of PEG sequences in the polymer also makes it possible to prepare soluble or insoluble polymers which may be used as supports for active principles in pharmaceutical compositions or for antigens in vaccines. Said polymers may, therefore, be used in the formation of implants, microspheres, microparticles or nanoparticles in combination with active principles. The nanoparticles will be composed of polymers with superior biodegradability in order to obtain more rapid release of the active principle. The implants, microspheres or microparticles will allow controlled release of the active principles.

The polymers according to the invention may also be conjugated with an active principle. By way of example, these active principles may be selected from anti-inflammatories, anti-tumour agents, immunosuppressants, anti-thrombotics, neuroleptics, anti-depressants, anti-hypertensive agents, peptides, proteins, particularly cytokines, nucleotides, or a non-toxic salt of said substances.

According to a preferred embodiment of the conjugated polymer according to the present invention, a polymer containing a polyfumarate sequence (A equals CH=CH) may be linked directly or via a polymeric or peptide arm to an active principle by a covalent bond. Examples of active principles include anti-tumour agents such as taxol, cis-platins and doxorubicins.

The invention also relates to a process for the preparation of the block polymers having the general formula (I). This process is characterised in that polyester sequences are polymerised with polyethylene glycol sequences and in that, optionally, polycarbonate sequences are introduced into the polymer According to a preferred embodiment of the process according to the invention, polyester sequences are prepared by polycondensation of dicarboxylic acid with diols. The introduction of the carbonate sequences may be carried out in the following manner: the terminal hydroxyl groups of a monomer or of an oligomer with a bis-hydroxy end group are converted to an activated derivative by reaction with a compound having the formula:

X—CO—X where X represents Cl or imidazole.

These activated derivatives react with hydroxyl compounds to obtain carbonate groups.

By using the reagents in a stoichiometric quantity, it is possible to obtain polymers with a high molecular weight. To this end, it is important to have good equivalence between the COX end groups of the activated oligomer and the OH end groups of the diols. In fact, for polycondensation reactions (assuming that the yield of the reaction is 100%), the molecular mass by weight is given by the equation:

$$X_n = (1+r)/(1-r)$$

where $X_n$ is the average degree of polymerisation and r is the ratio of complementary functional groups during the reaction.

The invention also relates to the use of a block polymer having the general formula (I) in pharmaceutical compositions. However, said polymers are not limited to such a use. They may be used in all fields requiring controlled biodegradability, for example, in agriculture.

The invention will be better understood by means of the following non-limiting examples.

EXAMPLE 1

Preparation of a Monocarbonate Block Polymer

A mixture of 0.34 ml (1.96 mmole) of ethyl diisopropylamine and 1.97 g (0.98 mmole) of a polyethylene glycol having a molecular weight of about 2000 daltons (PEG 2000) in 4 ml of chloroform was prepared. This mixture was added dropwise to a solution of 20% $COCl_2$ (phosgene) in toluene (2.4 ml, 4.91 mmole), kept in a cooling bath at 0° C. under nitrogen, and 15 minutes after the addition of the $COCl_2$ the remaining $COCl_2$ was removed by means of a stream of nitrogen for 30 minutes.

The solution was stirred by means of a magnetic stirrer and the solution was allowed to reach a temperature of 5° C.

A solution of PBS 3920 (3.85 g, 0.98 mmole) of ethyl diisopropylamine (0.34 ml, 1.96 mmole) and dimethylaminopyridine (0.12 g, 0.88 mmole) in 21 ml of chloroform was added dropwise to said reaction mixture.

The reaction mixture was taken out of the cooling bath and the solution was stirred for 12 hours. The organic solvents were evaporated and the product was dried under vacuum.

The polymer obtained had an intrinsic viscosity in chloroform at 30° C. of 0.26 dl/g. It contained 33.7 wt. % of PEG. It had the general formula (I) above in which: Pa=—[COA—COOB]— where A=$CH_2$—$CH_2$, t=23, B=$(CH_2)_4O$, s=1, Pb=COO, Pc=$[RO]_u$ where R=$CH_2$—$CH_2$ and u=45.5 and z=about 5.

EXAMPLE 2

Preparation of a Monocarbonate Block Polymer

A solution of 2 g of PBS 3920 (0.51 mmole), 180 mg (0.55 mmole) of carbonyl diimidazole and 2 g (0.5 mmole) of PEG 4000 was kept under nitrogen at a temperature of 60° C. in 15 ml of chloroform for 6 days.

The polymer was obtained by precipitation in ether.

The intrinsic viscosity in chloroform at 30° C. of the polymer obtained was 0.32 dl/g. The polymer contained 50 wt. % of PEG. It had the general formula (I) above in which: Pa=[COA—COOB]t where A=$CH_2$—$CH_2$, t=23, B=$(CH_2)O$, S=1, Pb=COO, Pc=$[RO]_u$ where R=$CH_2CH_2$ and u=91 and z=about 4.

EXAMPLE 3

Preparation of a Monocarbonate Block Polymer

A solution of 1 g of PBS 10.034 (0.51 mmole), 129 mg (0.39 mmole) of carbonyl diimidazole and 0.39 g (0.09616 mmole) of PEG 4000 was kept at 60° C. in 15 ml of chloroform for 6 days.

The product was obtained by precipitation in ether.

The intrinsic viscosity in chloroform at 30° C. was 0.36 dl/g. The polymer contained 36.7 wt. % of PEG. It had the general formula (I) above in which: Pa=$[COA—COOB]_t$ where A=$CH_2$—$CH_2$, t=59, B=$(CH_2)_4$—O, Pb=[COO], Pc=$[RO]_u$ where R=$CH_2CH_2$ and u=91 and z=about 2.

EXAMPLE 4

Preparation of a Polyester 4.7 g (48 mmoles) of maleic anhydride, 4.1 ml (46 mmoles) of butandiol and 8 g of PEG 4000 (2 mmoles) were stirred under nitrogen at a temperature of 200° C. for 24 hours. Nitrogen was bubbled through the solution in order to remove the water. The product was cooled under vacuum and recovered.

The polymer thus obtained had an intrinsic viscosity in chloroform at 30° C. of 0.38 dl/g. It contained 52 wt. % of PEG. It had the general formula

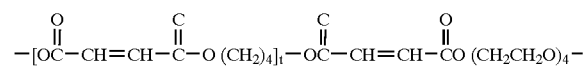

MORE DETAILED DESCRIPTION OF THE INVENTION that is, the general formula (I) above is as follows: Pa—Pa'
where Pa=$[COA—COOB]_t$,
where A=CH=CH,
B=$[CH_2]_nO$ where n=4
t=47

Pa'=$[COA—COOB']_{t'}$ where A=CH=CH,
B'=$(CH_2—CH_2)O$
t'=47

EXAMPLE 5

Preparation of a Polyester 34.9 g (0.3 mole) of fumaric acid, 21.03 ml (0.231 mole) of butandiol and 48 g (0.08 mole) of PEG 600 were stirred under nitrogen at a temperature of 200° C. for 24 hours. Nitrogen was bubbled through the solution in order to remove the water. The product was cooled under vacuum and recovered.

The polymer thus obtained had an intrinsic viscosity in chloroform at 30° C. of 0.23 dl/g. It contained 54 wt. % of PEG. It had an identical general formula to that of example 4.

EXAMPLE 6

Preparation of a Polymer From a Monoester Diol 45.31 ml (504.8 mmoles) of butandiol were added to 5 g (50.48 mmoles) of maleic anhydride. The solution was stirred at a temperature of 180° C. under nitrogen for 5 hours. The excess butandiol was then distilled under vacuum (0.1 torr) and the oily residue was recovered by, dissolution in chloroform, extraction by means of sodium bicarbonate and 0.1 mole of hydrochloric acid. The residue was dried over sodium sulfate, evaporated to dryness under vacuum and kept under high vacuum (0.05 torr) until a constant weight was obtained. The yield was 80%.

The NMR spectrum of the product showed the following structure:

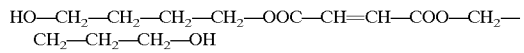

EXAMPLE 7

Preparation of a Polymer With a Bicarbonate Unit 0.34 ml (1.96 mmole) of ethyl diisopropylamine and 0.588 g (0.98 mmole) of PEG 600 were mixed in 4 ml of chloroform. This mixture was added dropwise to a solution of 20% $COCl_2$ (phosgene) in toluene (2.4 ml, 4.91 mmole), cooled to a temperature of 0° C. under nitrogen, and 15 minutes after the addition the excess $COCl_2$ was removed by means of a stream of nitrogen for 30 minutes.

The solution thus obtained was added dropwise to a solution of 0.254 g (0.98 mmole) of the diester obtained in the previous example, 0.34 ml (1.96 mmole) of ethyl diisopropylamine and 0.12 g (0.98 mmole) of dimethyl aminopyridine in 21 ml of chloroform cooled to 15° C. in a cooling bath. The solution thus obtained was agitated under nitrogen for 3 hours then diluted with 5 volumes of chloroform. The solution was purified by extraction with sodium bicarbonate and 0.01 mole of hydrochloric acid.

The residue was then dried over sodium sulfate and evaporated to dryness under vacuum and kept under high vacuum (0.05 torr) until a constant weight was obtained.

The polymer thus obtained had an intrinsic viscosity in chloroform at 30° C. of 0.90 dl/g. It contained 70 wt. % of PEG. The product was soluble in chloroform and in water. It had the formula (I) above in which:

$Pa = [COA\ COOB]$ where A: $CH=CH$,

B: $(CH_2)_4—O$, $t = 1, s = 1$ $Pb = COO$ $Pc = [RO]_u$ where $u = 13.6$    $R = CH_2—CH_2$ $Pd = COO$ $Pe = (CH_2)_4O$ $z$ = about 100.

EXAMPLE 8 a) Synthesis of PBS With a bis-Hydroxy End Group

A solution of 1,4-butandiol (29.74 g, 0.33 mole) was prepared in alcohol-free $CHCl_3$ (stabilised with amylene) and dried over $CaH_2$. After the solution had been decanted, 43.98 g (0.30 mole) of (recently distilled) succinyl chloride were poured dropwise into this solution, with stirring.

The reaction mixture was then kept at 0° C.–5° C. in an ice bath. During the reaction, $N_2$ was bubbled through the mixture to remove the HCl formed. When the addition had ended, the mixture was heated to 60° C. until there was no more HCl in the outflowing $N_2$.

A small quantity of the reaction mixture (5 ml) was taken as a sample, diluted with $CHCl_3$ (4 volumes), extracted with a saturated solution of $NaHCO_3$ then with distilled water. Finally, the organic phase was dried over anhydrous $Na_2SO_4$. The product was recovered by evaporation of the majority of the solvent under reduced pressure and by precipitation with $Et_2O$.

The product was characterised by its NMR spectrum and by chromatographic analysis.

The results showed a PBS with a bis-hydroxy end group having a number-average molecular mass of 2000.

b) The reaction residue was mixed with a solution of PEG 2000 (70 g) in $CHCl_3$ (stabilised with amylene) (130 ml) dried beforehand over $CaH_2$, and the mixture was divided into 2 equal parts. The first part of the solution was treated with N-ethyl diisopropylamine (29 g, 0.224 mole), and a solution of phosgene (20% in toluene) (17.84 ml, 0.28 mole) was added dropwise. The mixture was kept at 0° C.–5° C. in an ice bath and under an $N_2$ atmosphere. The excess phosgene was drawn off by bubbling $N_2$ through for 30 minutes, 15 minutes after the end of the addition. The second part of the solution was treated with N-ethyl diisopropylamine (29 g, 0.224 mole) and 4-dimethylaminopyridine (12.22 g, 0.1 mole). The first part of the solution, treated with phosgene, was added dropwise to the second part of the solution with stirring and under a nitrogen atmosphere, keeping the temperature at 0° C.–5° C. in an ice bath. The product was isolated using the procedure of example 8. The polymer obtained (115 g, 86.7%) was characterised by intrinsic viscosity (0.86 dl/g in $CHCl_3$ at 30° C.) and by NMR spectrum; this polymer contains 60% of PEG, having a structure represented by formula I in which $$Pa = [COA\text{---}COOB]_t \text{ where } A = CH_2CH_2$$
$$B = \text{---}(CH_2)_4\text{---}O\text{---}$$
$$t = 22$$
$$Pb = \text{---}COO \quad s = 1$$
$$Pc = \text{---}[RO]_u\text{---} \text{ where } R = CH_2CH_2$$
$$u = 45.5$$
$$Pd = \text{---}COO$$
$$Pe = \text{---}[CH_2)_4\text{---}C\text{---}$$
$$z = \text{about } 30.$$

EXAMPLE 9

The method of operating of example 9 was followed in which 43.22 g (0.30 mole) of fumaryl chloride were used instead of succinyl chloride. The polymer obtained (110 g, 83%) was characterised by intrinsic viscosity (0.98 dl/g in CHCl$_3$ at 30° C.) and by NMR spectrum; this polymer contained 51% of PEG residue and had a structure represented by formula I in which:

$$Pa = [COA\text{---}COOB]_t \text{ where } A: CH\text{=}CH$$
$$B = \text{---}(CH_2)_4\text{---}O\text{---}$$
$$t = 22$$
$$s = 1$$
$$Pb = COO$$
$$Pc = [RO]_u \text{ where } R = CH_2CH_2 \text{ and } u = 45$$
$$Pd = COO$$
$$Pe = \text{---}(CH_2)_4\text{---}O\text{---}$$
$$z = \text{about } 40$$

EXAMPLE 10

A solution of PBS with a bis-hydroxy end group was prepared, isolated and characterised as in example 10 a). Then, as in example 8, using 0.588 g of PEG 600 in CHCl$_3$ (stabilised with amylene) dried beforehand over CaH$_2$ instead of 1.96 g (0.98 mole) of PEG 2000 and 1.96 g (0.98 mole) of PBS with a bis-hydroxy end group instead of 2.54 g of diester, 0.32 g (81%) of a polymer were obtained having an intrinsic viscosity of 0.64 dl/g (in CHCl$_3$ at 30° C.) and having 60% of PEG residue with a structure according to formula I in which:

$$Pa = \text{---}[COA\ COOB]_t \text{ where } A = CH_2CH_2$$
$$B = \text{---}(CH_2)_4\text{---}O\text{---}$$
$$t = 22$$
$$s = 1$$
$$Pb = [COO]$$
$$Pc = [RO]_u \text{ where } R = CH_2CH_2$$
$$Pd = [COO] \quad u = 45.5$$
$$Pe = (CH_2)_4\text{---}O\text{---}$$
$$z = \text{about } 30.$$

What is claimed is:

1. Non crosslinked block polymer having the general formula (I)

$$[\text{---}Pa\text{---}(Pb\text{---}Pc)_s\text{---}Pa'\text{---}Pd\text{---}Pe]_z$$

wherein:
z=1 to 20,
S=0 to 25,
Pa represents:

$$\text{---}[COA\text{---}COOB]_t\text{---}$$

where:
t=1 to 150, and
A represents CH=CH or CH$_2$—CH$_2$
B represents (CH$_2$)$_n$—O— where n=1 to 7,
Pb represents —[COO]—$_x$ where x=0 or 1,
Pd represents:

$$\text{---}[COO]_y\text{---}$$

where y=0 or 1
provided that if s=0 or x=0 then y=1, and if y=0 then s≠0 and x=1;
Pc and Pe, each independently of one another, represent:

$$[RO]_u$$

where:
u=4 to 150, and
R represents an alkylidene,
Pa' represents —[COA—COOB']—$_t$
where A has the same meaning as above
B' represents (CH$_2$)$_n$'O, where n'=1 to 7, and t'=0 to 150
the weight-average molecular mass of the polymer being in the range 2,000 daltons to 300,000 daltons.
2. Non crosslinked block polymer according to claim 1, wherein, R represents —CH$_2$—CH$_2$—.
3. Non crosslinked block polymer having the general formula (I) as defined in claim 1, having a molecular mass greater than 20,000 daltons whilst remaining soluble and biodegradable and targeting tumour cells by an EPR effect.

* * * * *

UNITED STATES PATENT AND TRADEMARK OFFICE
CERTIFICATE OF CORRECTION

PATENT NO. : 6,660,810 B1
DATED : December 9, 2003
INVENTOR(S) : Ferruti et al.

It is certified that error appears in the above-identified patent and that said Letters Patent is hereby corrected as shown below:

Column 8,
Line 44, delete "-[COA-COOB']-t" and insert therefor -- -[COA-COOB']$_{t'}$ --
Line 46, delete "$(CH_2)_n$'O" and insert therefor -- $(CH_2)_{n'}O$ --

Signed and Sealed this

Thirtieth Day of November, 2004

JON W. DUDAS
*Director of the United States Patent and Trademark Office*